Aug. 27, 1963 K. BUEHLER ETAL 3,101,761
APPARATUS FOR FORMING FOOD PORTIONS OF UNIFORM WEIGHT
BY VOLUMETRIC MEASUREMENT
Filed Feb. 17, 1959 11 Sheets-Sheet 1

FIG.1

INVENTORS
KARL BUEHLER
MURRAY L. ROLLINS
BY
Cameron, Kerkam & Sutton
ATTORNEYS

FIG. 2

INVENTORS
KARL BUEHLER
MURRAY L. ROLLINS
BY Cameron, Kerkam & Sutton
ATTORNEYS

Aug. 27, 1963

K. BUEHLER ETAL 3,101,761

APPARATUS FOR FORMING FOOD PORTIONS OF UNIFORM WEIGHT
BY VOLUMETRIC MEASUREMENT

Filed Feb. 17, 1959

INVENTORS
KARL BUEHLER
MURRAY L. ROLLINS
BY Cameron, Kerkam & Sutton
ATTORNEYS

FIG.11

INVENTORS
KARL BUEHLER
MURRAY L. ROLLINS

INVENTORS
KARL BUEHLER
MURRAY L. ROLLINS
BY Cameron, Kerkam & Sutton
ATTORNEYS

United States Patent Office 3,101,761
Patented Aug. 27, 1963

3,101,761
APPARATUS FOR FORMING FOOD PORTIONS OF UNIFORM WEIGHT BY VOLUMETRIC MEASUREMENT
Karl Buehler, Lima, and Murray L. Rollins, Albion, N.Y., assignors to General Foods Corporation, White Plains, N.Y., a corporation of Delaware
Filed Feb. 17, 1959, Ser. No. 793,928
9 Claims. (Cl. 146—153)

This invention relates to apparatus for forming food portions of uniform weight by volumetric measurement. The apparatus has application to the formation of large and small particles of beef, poultry and like meat and vegetable particles into portions for accurate filling of such products as meat pies, prepared dinner plates, and other packaged products calling for accuracy of fill.

This application is a continuation-in-part of our copending application Serial No. 772,614, filed November 7, 1958, for Apparatus for Forming Food Portions of Uniform Weight by Volumetric Measurement, which is now abandoned.

In the manufacture of so-called meat pies mechanically it has been the practice to hand fill the pie shells with diced meat pieces before the same are frozen. Conveyors moved meat pie shells past workers who hand-filled the pie shells with diced meat from a supply using measuring cups. This practice was accompanied by erratic variations in weight due to inability to volumetrically measure the weight of diced meat quantities in the cup. Even the most skilled worker was unable to control the weight of diced meat supplied to a given pie and accuracy of fill varied from worker to worker. Deboned poultry, beef and like meats also presented a different problem in the form of very small meat particles which could not be accurately weighed on a volumetric basis. Available apparatus for shaping and cutting both large and fine meat particles into portions of uniform size are either unable to provide portions of uniform weight or tend to destroy the desired intact condition of the larger meat particles. The purpose of employing some diced meat in prepared foods is to assure the presence of flavorful intact meat pieces in a condition whereby the meat will not break up when cooked in a soup or other liquid vehicle for the meat. Hence, for such uses as meat pies it is important that the formed meat portions employed to fill the pie shell retain much of their original intact condition and be of uniform density as well as volume for accuracy of filling. Difficulty in meeting these requirements by extruding meat particles into portions of uniform shape is compounded by the necessity for speed of operation and yet the gentleness which must be practiced in order that compacted meat chunks will not unduly shred or otherwise breakup.

It is a primary object of the present invention to provide means whereby individual pieces of a meat or vegetable can be sized into a wafer or similar shape of uniform density with resultant volumetric weight control while avoiding a high degree of compression of the meat such that the wafer readily separates in a product into its individual pieces and said pieces are in an intact condition.

Another object of the invention is to provide means whereby the foregoing object can be accomplished rapidly and automatically to overcome the disadvantages of hand filling of food products and to increase the use of finely divided meat particles resulting from deboning.

The apparatus of the present invention overcomes the difficulties previously experienced with hand filling and fills the product with portions containing large pieces of meat. The apparatus does not compress the meat; each portion delivered contains large pieces of meat without an excessive amount of small bits of meat; the weight variation between deliveries is quite narrow; and the dispenser operates at a high delivery rate.

It is present practice in the meat pie filling art to dispense pie tins into a mold carrying four tins. Each mold is moved by a conveyor past a first station where a blanket of dough is placed over the tins; then past a second station where the dough is shaped into a pie shell forming pockets in the tin; then past a third station where the sauce is pumped into the dough shells; then at the fourth station the dough shells are filled with meat; then to a fifth station where a blanket of dough is placed over the top of the filled pies; and then to sixth station where the top blanket of dough and the dough forming the crusts are trimmed off to complete the pies ready for freezing. To fill the four shells of a pie at the meat filling station requires four dispensers, one for each pie, and it has been found convenient to separate the four dispensers into two units, each unit having two dispensers arranged to dispense into pies arranged diagonally on the mold. Thus, with the pies forming pockets in the mold arranged at the corners of a rectangle and looking down on the mold the first unit will fill the upper left and lower right pies and the second unit will fill the upper right and lower left pies.

Each dispenser of the present invention includes a hopper into which deboned meat such as undiced chicken or turkey meat is hand fed and the hopper connects to a horizontal tube, both hopper and tube being provided with piston means for moving the meat therein. The large pieces of meat tend to align themselves longitudinally and parallel to the axis of the hopper and of the extrusion tube. During extrusion the meat within the extrusion tube is sealed off from the hopper by the rotation of means within the tube which operate also to cut meat pieces bridging the tube and the hopper. The action of the extrusion piston is intermittent and extrudes the meat against a stop plate. As soon as the meat contacts and moves the stop plate a predetermined amount the extrusion piston is stopped and the meat is not under pressure. This prevents excessive compacting of the meat. A knife severs the meat between the stop plate and the end of the extrusion tube perpendicular to the axis of extrusion and hence to the alignment of the meat pieces so that the delivered portion of meat which is dropped by gravity into the pie shell consists of larger pieces of meat which separate readily. It has been found that this dispenser dispenses relatively uniform charges of large chunks of meat into the pie shells with the portions varying only slightly.

The intermittent action of the extrusion piston on the aligned pieces is controlled by the operation of the stop plate which stops the movement of the piston when the extruded meat particles contact the stop plate. This feature of the apparatus is most important. The hopper and tube together with the piston means for moving undiced meat into the extrusion tube are for the purpose of aligning meat particles in the extrusion tube; variations in the percentage of void space between meat particles newly introduced to the extrusion tube after each stroke of the extrusion piston will occur. For a constant stroke extrusion piston variations in the degree of compaction of the meat particles would normally occur in accordance with variations in the volume of uncompacted meat pieces aligned in the extrusion tube; compaction under these conditions would create variations in density of the extruded meat and in the case of a larger than average charge of uncompacted meat particles would cause shredding and breakup of otherwise intact chunks; thus a fixed stroke would result in varying displacement of the compacted particles such that a fixed stroke would not displace and extrude constant meat increments from the extrusion tube.

By virtue of the present apparatus such variations in the charge of aligned uncompacted meat particles in the sealed extrusion tube present no such problem; the mass of meat particles introduced in each cycle is displaced in the tube by a piston force sufficient to collect the particles together in uniform amounts axially of the piston and the extrusion tube to a point where they are moved as a unit mass of meat in their aligned condition with a stepwise movement by a plurality of piston strokes against friction within the tube, such friction being sufficient to produce extruded increments of contact density; the compacted meat particles eventually issue with a constant density from the tube and strike the stop plate whereupon the stroke of the extrusion piston is terminated, which termination is controlled exclusively in accordance with the achievement of the degree of compaction of aligned meat particles required to cause such particles to move as one within the extrusion tube and similarly displace previously compacted meat particles against the stop plate by a predetermined increment.

In the accompanying drawings, in which like reference characters indicate like parts.

*Sequence of Operations of a Dispensing Element*

Figure 10:
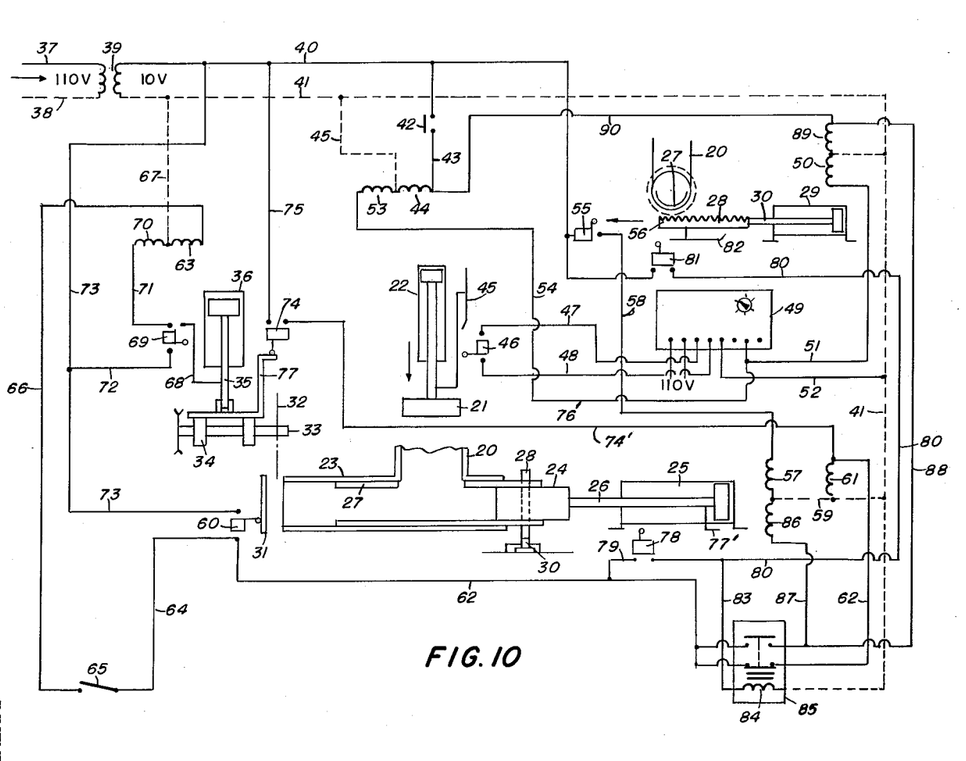
FIG. 10 is a schematic circuit and structural diagram illustrating the operation of a dispensing element with the structure shown schematically and not in detail.

Referring now more particularly to FIG. 10, a diagrammatic layout of a suitable electric circuit and a schematic arrangement of associated mechanical elements for one dispensing element is there shown. Each dispensing element of the four dispensing elements making up the dispenser of the present invention includes a vertically disposed hopper 20 which is hand filled with the meat and a piston 21 actuated by cylinder 22 moves the meat downwardly in hopper 20. Hopper 20 connects to a horizontally disposed extrusion cylinder 23 in which piston 24 is intermittently moved by the piston in cylinder 25 through connecting rod 26. The discharge opening of hopper 20 into cylinder 23 is closed by rotary sleeve 27 which is rotated by rack 28 which is reciprocated by a piston in cylinder 29 through connecting rod 30.

The meat extruded from cylinder 23 engages stop plate 31 and is severed by rotary knife 32 which is mounted on shaft 33 rotated in frame or housing 34 by suitable means. Frame 34 is connected by rod 35 with the piston in cylinder 36 to move knife 32 into and out of cutting position.

Figure 11:
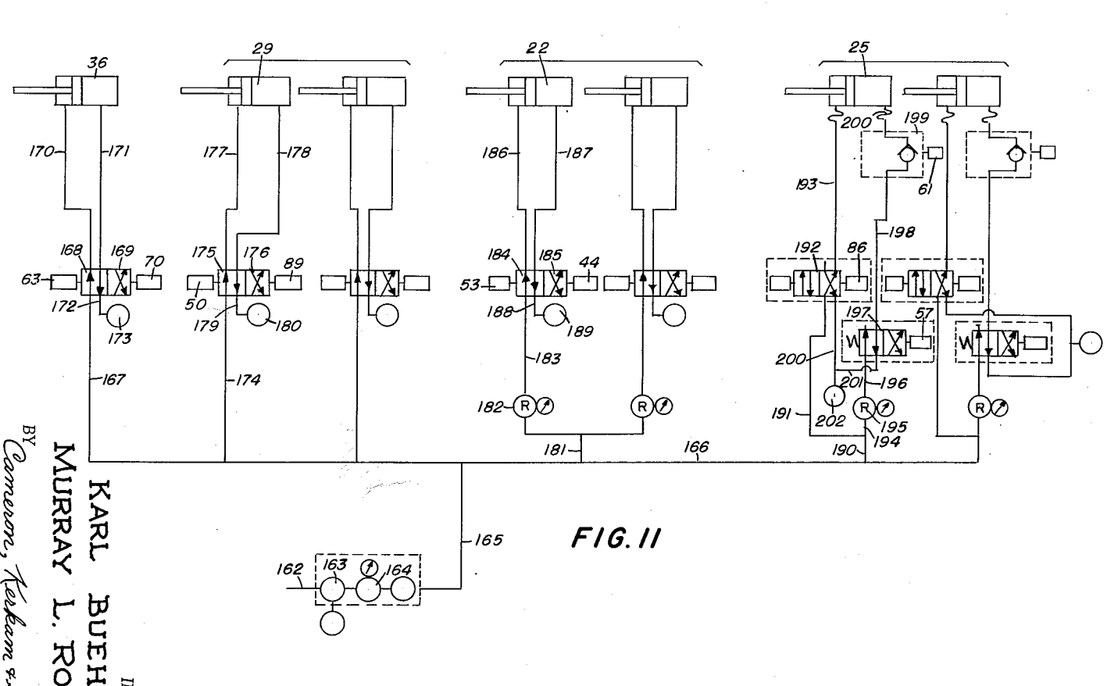
FIG. 11 is a diagrammatic showing of the pneumatic system of a dispensing unit.

It is to be understood that the cylinders 22, 25, 29 and 36 and their associated pistons are of any suitable pneumatically operated type and are double acting with air under pressure admitted to the desired side of the piston by suitable solenoid actuated valves such as valve 192 in FIG. 11 preferably mounted in or on the end of the cylinder.

Electric current to operate the solenoid valves of the various cylinders in timed sequence is obtained from a suitable source 37, 38 and is reduced in voltage through stepdown transformer 39 and current of reduced voltage is supplied to wires 40 and 41. When the dispensing element is at rest the piston in cylinder 25 is at the right hand position and piston 24 is in its right hand position; the piston in cylinder 22 is in its upper position and piston 21 is raised; the piston in cylinder 36 is in its upper position and knife 32 is raised away from the dispensing end of cylinder 23; and the piston in cylinder 29 is in its retracted position so that sleeve 27 opens hopper 20 into cylinder 23. When the dispensing element is to be placed in operation switch 42 is manually closed and current passes through wire 43 and coil 44 and the circuit is completed through wire 45. Energizing of coil 44 actuates the solenoid actuated valve such as valve 185 in FIG. 11 of cylinder 22 to supply air under pressure to the upper side of the piston therein and the piston 21 moves downwardly in hopper 20 pushing meat into cylinder 23. As piston 21 moves downwardly switch engaging element 45 moves downwardly and engages and closes micro-switch 46 and maintains micro-switch 46 in closed position.

Closing of micro-switch 46 acting through wires 47 and 48 initiates the action of any suitable timer 49. After a suitable time interval has elapsed as determined by the presetting of timer 49, timer 49 energizes coil 50 through wires 51 and 52. Coil 50 energizes the solenoid actuated valve associated with cylinder 29 to supply air under pressure to the piston therein to move rack 28 and rotate sleeve 27 to close the orifice between the hopper 20 and cylinder 23, confining the meat in cylinder 23. At the same time timer 49 energizes coil 53 through wire 54 and coil 53 energizes the solenoid actuated valve of cylinder 22 which supplies air under pressure thereto to raise piston 21 and open micro-switch 46.

As rack 28 nears the end of its stroke which rotates sleeve 27 toward closed position, micro-switch 55 is closed by switch actuator 56 and coil 57 is energized through wire 58, the circuit being completed through wire 59 and 41. Coil 57 energizes the solenoid actuated valve associated with cylinder 25 which admits air under pressure to the right side of the piston therein and moves the piston, its rod 26 and piston 24 to the left. As piston 24 moves to the left the meat confined within cylinder 23 is extruded from the left end thereof into engagement with stop plate 31. When the extruded meat engages stop plate 31 micro-switch 60 is closed and coil 61 will be energized through wire 62 with the circuit being completed through wire 59 and 41. Coil 61 energizes a solenoid actuated valve associated with cylinder 25 shutting off the compressed air supply thereto, and motion of piston 24 and the extrusion of meat from cylinder 23 is momentarily terminated.

Closing of microswitch 60 energizes coil 61 by closing a circuit through wire 62 to cut off the air supply to cylinder 25 which stops the extrusion of the meat. Also closing microswitch 60 energizes coil 63 by closing a circuit through wire 64, switch 65, wire 66 and wire 67 and coil 63 energizes the solenoid actuated valve associated with cylinder 36 to admit air under pressure to the upper side of the piston therein to move the piston, its connecting rod 35 and frame 34 downwardly to bring rotating knife 32 into position to sever the meat extruded from the end of cylinder 23 and engaging stop plate 31. Movement of knife 32 downwardly closes switch 74 to energize coil 61 through wire 74', to insure that the air supply to cylinder 25 is cut off and to insure that the extrusion of the meat is stopped during the cut-off operation. Suitable mechanical means actuated by the downward movement of frame 34 may be provided to move stop plate 31 and its microswitch 60 to the left as knife 32 severs the meat extruded from cylinder 23 so that the severed portion of meat will fall readily into the pie shell position beneath the end of cylinder 23.

The sequence of timed events as described above is coordinated with the movement of the conveyor bringing the pie shells to be filled beneath the end of cylinder 23 by timing switch 65 which is closed only by the positioning of a pie shell beneath the end of cylinder 23.

At the end of the downward stroke of the piston in cylinder 36 switch actuator 68 closes microswitch 69 and coil 70 will be energized through wires 71, 72 and 73. Coil 70 energizes the solenoid actuated valve associated with cylinder 36 to supply air under pressure thereto to move the piston therein upwardly and retract knife 32.

As the severed meat portion falls from between stop plate 31 and the extrusion end of cylinder 23 microswitch 60 is opened when the pressure exerted by the meat portion thereon terminates, deenergizing coil 61, and air under pressure will then be admitted to cylinder 25 to move the piston therein and piston 24 further to the left until the extruded meat again engages stop plate 31 and is cut off, this cycle being repeated until piston 24 reaches the left hand portion of its stroke.

Continued energization of coil 61 is insured during downward movement of knife 32 to prevent additional extrusion from cylinder 23 by microswitch 74 and wires 75 and 76 which connect the coil to the wire 40, microswitch 74 being closed when actuator 77 and knife 32 start their downward movement.

The above described extruding and severing cycle will continue until switch actuator 77' carried by connecting rod 26 engages and closes microswitch 78. Extrusion will continue thereafter until stop plate 31 is engaged closing microswitch 60. Microswitches 60 and 78 are connected in series by wires 62 and 79, wire 80 connecting microswitch 78 with microswitch 81 which has been closed by switch actuator 82 carried by rack 28. Wire 80 is connected by wire 83 to coil 84 of relay 85 and when microswitches 60 and 78 are closed coil 84 is energized and relay 85 then energizes coil 86 through wire 87. Energization of coil 86 energizes the solenoid actuated valve associated with cylinder 25 to admit air under pressure thereto to move the piston therein to the right and to move piston 24 to the right. As piston 24 moves to the right microswitch 81 which is now closed will take over the function of microswitch 78 so that the piston in cylinder 25 will move to the right as long as microswitch 60 is closed during the re-load operation.

When relay 85 is actuated current passes through wire 88 to coil 89. Energization of coil 89 energizes the solenoid actuated valve associated with cylinder 29 to admit air under pressure thereto to withdraw rack 28 and rotate sleeve 27 to position opening hopper 20 into cylinder 23. Energizing coil 89 acting through wire 90 energizes coil 44 thus admitting air under pressure to cylinder 22 to move piston 21 downwardly in hopper 20 and move meat into cylinder 23, setting a repeat cycle in operation.

*The Dispensing Unit*

As pointed out above, the dispensing unit of the present invention comprises four dispensing elements each operating as above described, and for ease in construction and handling the dispensing elements are arranged in pairs on separate stands with the pairs of dispensing elements arranged to dispense into diagonal pie shells on a mold carrying four pie shells placed at the corners of a rectangle. Thus, in FIG. 1 two dispensing elements generally indicated at 91 and 92 are arranged on support 93 with element 91 dispensing at the position generally indicated at 94 and element 92 dispensing at the position generally indicated at 95. The second pair of dispensing elements are indicated at 96 and 97 and are mounted upon their separate support 98. Dispensing element 96 dispenses adjacent position 99 and dispensing element 97 dispenses adjacent position 100. Supports 93 and 98 are arranged in parallel back to back relationship with dispensing positions 94, 95, 99 and 100 arranged over the conveyor, generally indicated at 101, upon which the molds carrying the pie shells are moved into position to receive the dispensed meat portions. A mold moving on conveyor 101 in the direction of the arrow in FIG. 1 and having four pie shells placed thereon at the corners of a rectangle will have the upper left and lower right hand shell filled by dispensing elements 91 and 92, respectively, and the upper right hand and lower left hand pie shells will be filled by dispensing elements 96 and 97, respectively.

*A Dispensing Element*

Since each of the dispensing elements 91, 92, 96 and 97 is of identical structure it will suffice to describe one of them until description of the cutting head is reached when it will be necessary to describe structure for supporting the knives for adjacent ones of said dispensing elements. For the purposes of description dispensing element 97 is selected since it is seen from above in FIG. 1 and is seen from the side in FIG 2. The sectional views of FIGS. 3–9 apply to any one of the dispensing elements 91, 92, 96 and 97.

Figure 1:
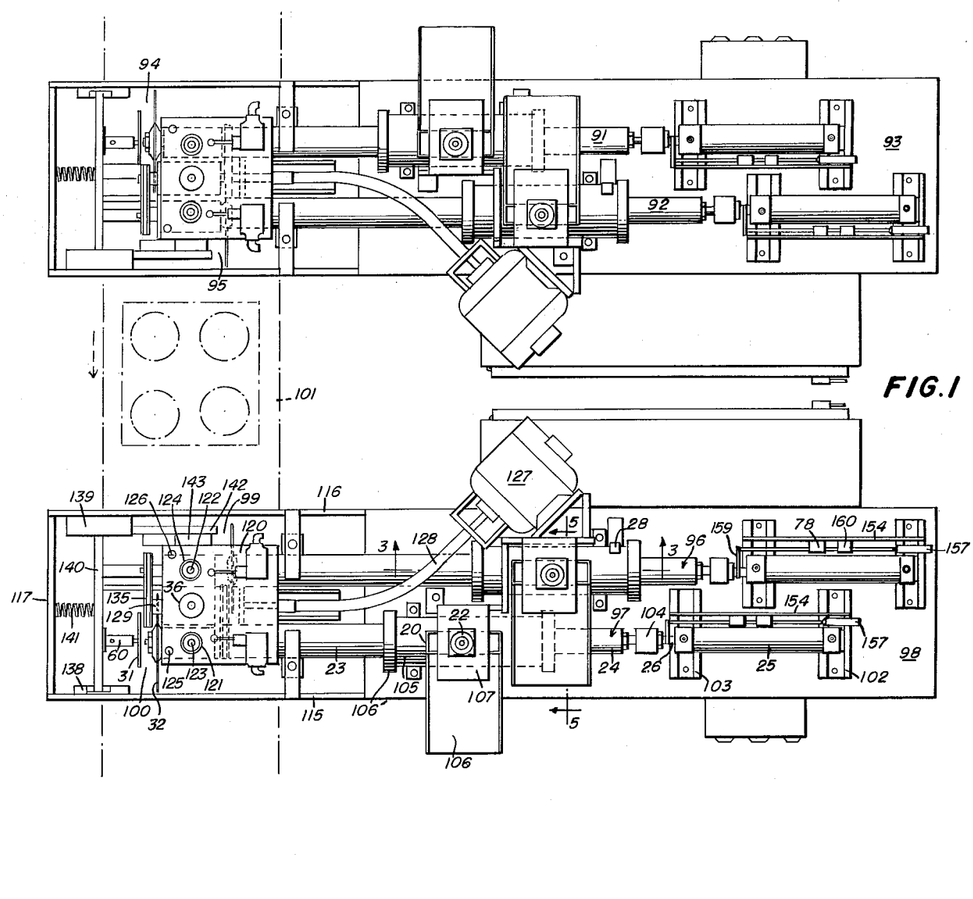
FIG. 1 is a view from above of an embodiment of the invention having four dispensing elements divided into right and left hand dispensing units with the conveyor for the trays carrying the pie shells shown schematically beneath the ends of the dispensing elements.
Figure 2:
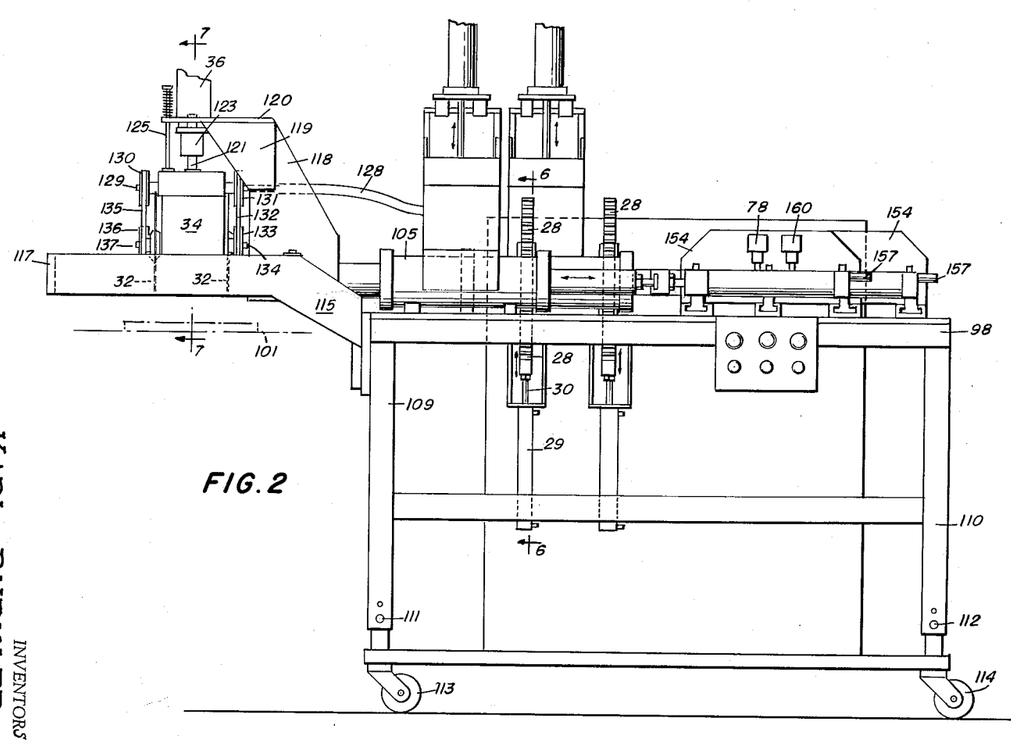
FIG. 2 is a side view of the right hand dispensing unit of FIG. 1.
Figure 3:
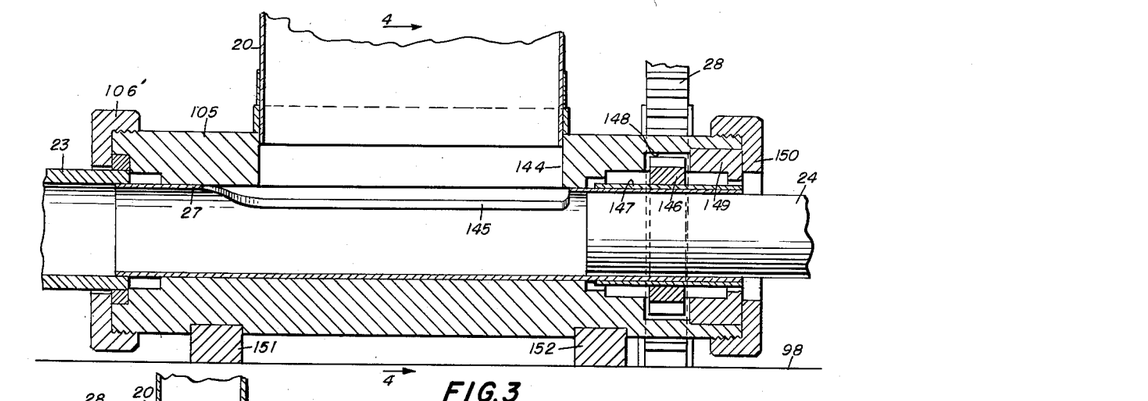
FIG. 3 is an enlarged sectional view of a part of one of the dispensing elements seen on the line 3—3 of FIG. 1.

Referring therefore to dispensing element 97 in FIGS. 1 and 2, cylinder 25 is mounted on support 98 by suitable adjustable brackets 102 and 103 and piston rod 26 is connected to piston 24 through a suitable flexible connector 104. One end of cylinder 23 is received in housing 105 and is secured therein by gland nut 106', hopper 20 opening into the interior of housing 105 and thence into the open end of cylinder 23. Hopper 20 is provided with a lip or tray 106 upon which the meat is manually placed. Platform 107 supports cylinder 22 so that piston 21 can be reciprocated within hopper 20. Cylinder 29 is suitably mounted beneath support 98 and rack 28 passes upwardly through a suitable opening in support 98 as seen at 108 in FIG. 6. Support 98 may be mounted upon any suitable framework 109 and 110 of adjustable height at 111 and 112 to adapt the machine for any height of conveyor 101 and the support may be castered as at 113 and 114 for ready movement.

Figure 7:
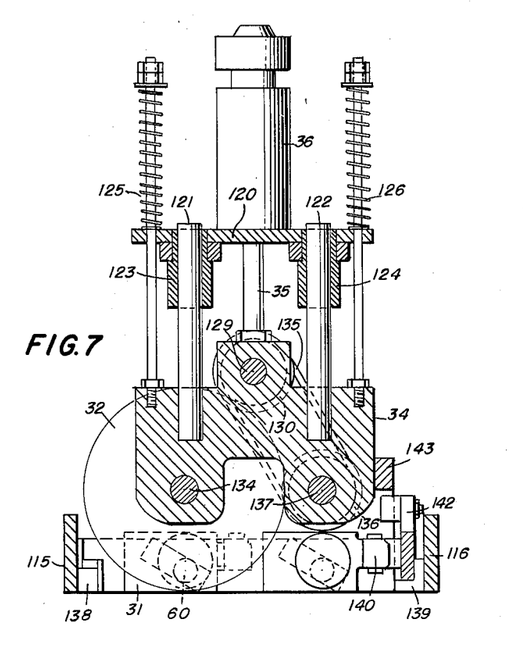
FIG. 7 is an enlarged view partly in section on the line 7—7 of FIG. 2 showing the detail of the knife supporting housing.

Support 98 is provided with a hollow frame extension vertically displaced with respect thereto having side plates 115 and 116 and end plate 117. A vertical framework is secured to side plates 115 and 116 and includes side plates 118 and 119 and cross plate 120 upon which cylinder 36 is mounted. Knife housing 34 is mounted beneath plate 120 on piston rod 35 and is provided with guide posts 121 and 122 which pass upwardly through bushings 123 and 124 carried by plate 120. Housing 34 is provided with spring returns 125 and 126 which are compressed when housing 34 moves downwardly and assist in returning housing 34 to its upper position. Any suitable electric motor 127 driving through flexible shaft 128 rotates central shaft 129 mounted in housing 34. Shaft 129 carries pulleys 130 and 131. Pulley 131 driving through belt 132 rotates pulley 133 and shaft 134 which is mounted in housing 34 and rotates knife 32 carried on shaft 134 for dispensing element 97. Pulley 130 driving through belt 135 rotates pulley 136 on shaft 137 which is mounted in housing 34 and rotates knife 32 for dispensing element 96.

Side plates 115 and 116 carry respectively side tracks 138 and 139 in which a suitable frame 140 is mounted for rectilinear movement. A spring 141 urges frame 140 toward its right position as seen in FIG. 1. Frame 140 carries stop plate 31 and its associated micro-switch 60. Frame 140 carries cam arm 142 which is engaged by a suitable cam surface 143 mounted on housing 34. The cooperation between cam arm 142 and cam surface 143 is such that when knife 32 moves toward its lowest position frame 140 is moved to the left against the action of spring 141 to move stop plate 31 away from knife 32 to free the severed meat portion so that it may fall freely into the pie shell.

Details of Construction

Referring now to FIGS. 3–6 structural details are there shown for operating sleeve 27 which cuts off the meat fed downwardly in hopper 20 into horizontal cylinder 23. As is seen in these figures, housing 105 is provided with a suitable aperture 144 in which the lower end of hopper 20 is suitably mounted. Sleeve 27 which rotates within housing 105 and within the right end of cylinder 23 is provided with an opening 145 which in one position of cylinder 27 coincides with the opening in the lower end of hopper 20. Sleeve 27 is rotated by rack 28 which engages gear 146 mounted on sleeve 147 which in turn is secured to the outer surface of sleeve 27. Housing 105 is suitably chambered at 148 to receive these elements and chamber 148 also receives bearing member 149 which is secured in position by gland nut 150. Housing 105 is suitably mounted on support 98 by base members 151 and 152.

Figure 4:
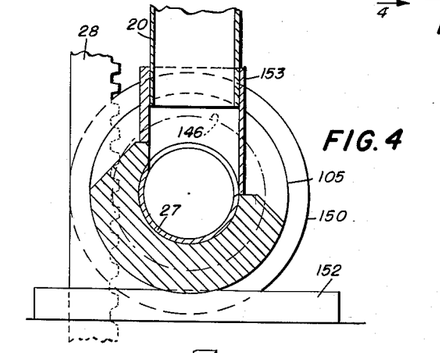
FIG. 4 is a cross-sectional view of a portion of the structure shown in FIG. 3 on the line 4—4 thereof.
Figure 5:
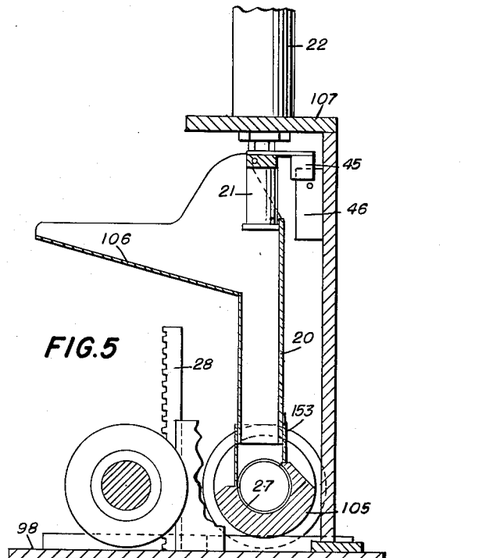
FIG. 5 is an enlarged view partly in section of a part of the dispensing unit of FIG. 1 on the line 5—5 thereof.

As more clearly seen in FIGS. 4 and 5, the lower end of hopper 20 is provided with a suitable extension 153 which is secured in opening 144 in housing 105.

Figure 6:
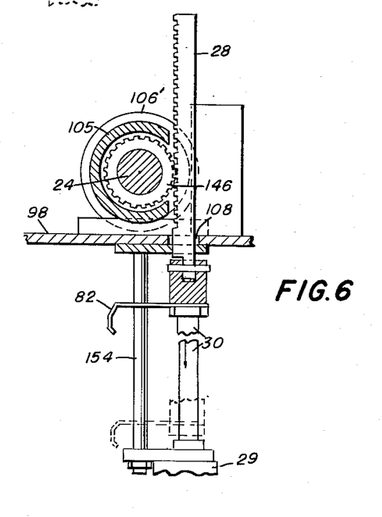
FIG. 6 is an enlarged view partly in section on the line 6—6 of FIG. 2 showing the structure for rotating the inner sleeve.

As seen in FIG. 6, a guide rod 154 may be provided which passes through switch actuator 82 and prevents rotation of rack 28 about its long axis during its reciprocating movement.

Figure 8:
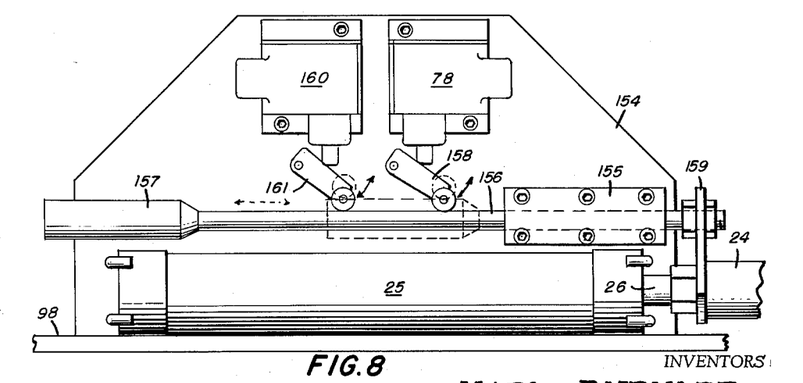
FIG. 8 is an enlarged detail of the switch structure actuated by the horizontal extrusion piston as seen from the rear in FIG. 1.
Figure 9:
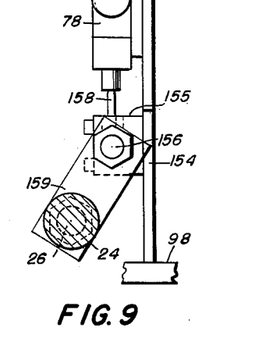
FIG. 9 is a view from the left of the structure of FIG. 8.

FIGS. 8 and 9 show details of construction for the operation micro-switch 78. A vertical plate 154 is mounted on support 98 behind cylinder 25 and micro-switch 78 is mounted on plate 154. A bearing block 155 is also secured to plate 154 and supports rod 156 therein for reciprocating movement. Rod 156 carries cam head 157 to engage the actuating lever 158 of switch 78. Rod 156 is coupled to piston rod 26 by link 159 so that rod 156 moves with piston rod 26. As piston rod 26 moves toward the end of the extrusion stroke of piston 24 cam head 157 will raise actuating arm 158 to actuate micro-switch 78 in the cycle of operation as above described. A second switch 160 may be actuated by cam head 157 through its actuating arm 161 to close a suitable warning light circuit when piston 24 has reached the end of its extrusion stroke and piston 21 has been raised to warn the machine operator to supply meat to hopper 20.

The Pneumatic System

FIG. 11 shows schematically a suitable pneumatic system for use with the present invention. The pneumatic system illustrated is for both the left hand and right hand extrusion elements of each unit and a description of the system as applied to left hand element 97 should suffice, it being understood that the pneumatic system for the right hand element 96 is duplicative thereof. Air under pressure is supplied to pipe 162 which leads through a suitable liquid trap 163 and pressure regulator 164 to pipe 165 which in turn connects to pipe 166. Pipe 166 connects to pipe 167 leading to solenoid controlled valves 168 and 169 of cylinder 36. Solenoid 63 controls valve 168 and solenoid 70 controls valve 169, see FIG. 10. Pipe 170 leads from valves 168 and 169 to the left side of cylinder 36 and pipe 171 leads therefrom to the right side of cylinder 36. Exhaust pipe 172 leads from valves 168 and 169 to muffler 173. As described above for FIG. 10, when solenoid 63 is energized air under pressure is admitted to the right end of cylinder 36 to move knives 32 downwardly and when solenoid 70 is energized air is admitted to the left side of cylinder 36 to raise knives 32, the air exhausted from the low pressure side of cylinder 36 passing outwardly through muffler 173.

Pipe 174 is connected to pipe 166 and connects to solenoid actuated valves 175 and 176 of cylinder 29, pipes 177 leading therefrom to the left side of cylinder 29 and pipe 178 leading therefrom to the right side of cylinder 29. Pipe 179 leads from valves 175 and 176 to exhaust muffler 180. When solenoid 50 is energized air under pressure is admitted to the right side of cylinder 29 to rotate sleeve 27 and when solenoid 89 is energized air is admitted to the left side of cylinder 29 to reverse the rotation of sleeve 27 and open cylinder 23 to hopper 20. Exhaust air from the low pressure side of cylinder 29 exhausts through pipe 179 and muffler 180.

Pipe 181 connects to pipe 166 and connects through pressure regulating valve 182 and pipe 183 to solenoid actuated valves 184 and 185 of cylinder 22. Valves 184 and 185 are connected to the left side of cylinder 22 by pipe 186 and to the right side thereof by pipe 187. When solenoid 44 is actuated air under pressure is admitted to the right side of cylinder 22 to move piston 21 downwardly in hopper 20 and when solenoid 53 is actuated air under pressure is admitted to the left side of cylinder 22 to raise piston 21. Exhaust air from the low pressure side of cylinder 22 passes from valves 184 and 185 through exhaust pipe 188 to muffler 189.

Pipe 190 connects to pipe 166 and connects through branch pipe 191 to solenoid actuated valve 192 which in turn is connected by pipe 193 to the left side of cylinder 25. Pipe 194 connects to pipe 190 and connects through pressure regulating valve 195 to pipe 196 and solenoid actuated valve 197. Valve 197 is connected by pipe 198 to solenoid actuated valve 199 which in turn is connected by pipe 200 to the right side of cylinder 25. Valve 192 exhausts through pipe 200 to muffler 202 and valve 197 exhausts through pipe 201 to muffler 202.

When solenoid 86 is energized valve 192 admits air under pressure to the left side of cylinder 25 to move extrusion piston 24 to the right as seen in FIG. 10 and when solenoid actuated valve 197 is energized by solenoid 57 air is admitted under pressure to the right side of cylinder 25 to move extrusion piston 24 to the left in FIG. 10. When solenoid 61 is energized valve 199 is closed to prevent further movement of piston 24 during the cut-off cycle.

Figure 12:
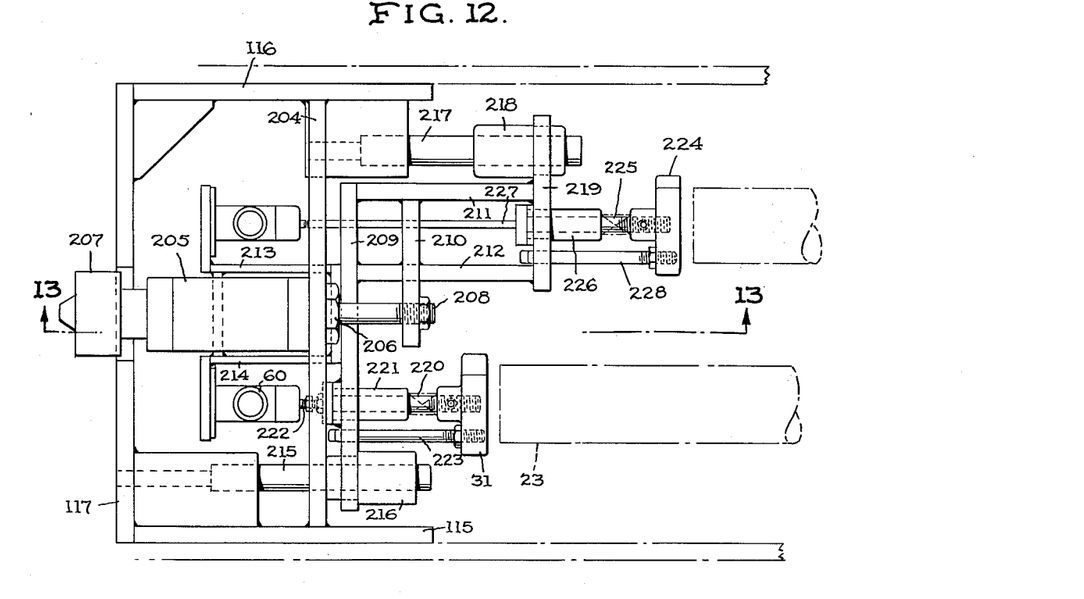
FIG. 12 is an enlarged detail of suitable pneumatic mechanism for moving the stop plates away from and toward the ends of the extrusion cylinders.

FIG. 12 shows suitable apparatus for pneumatically moving a stop plate such as stop plate 31 away from the open end of the dispensing cylinder 23 after knife 32 has severed the meat pieces so that the delivered portion of the meat may more readily drop by gravity into its pie shell. In this construction frame members 115, 116 and 117 are provided with a cross frame member 204 suitably secured as by welding between frame members 115 and 116 and a suitable pneumatic double acting cylinder and piston 205 is secured to frame member 204 as by nut 206. Air under pressure from the pneumatic system of the apparatus is admitted to the selected side of the piston in cylinder 205 by the actuation of a solenoid actuated valve 207 which is connected into the pneumatic and electric circuits of the apparatus as will appear more fully hereinafter.

Figure 13:
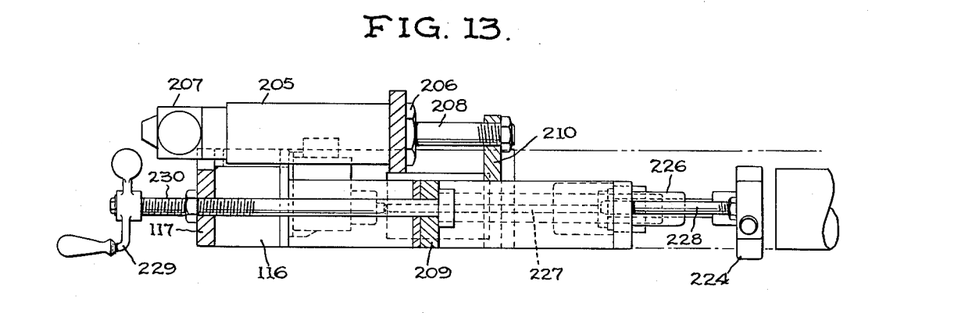
FIG. 13 is an elevation partly in section on the line 13—13 of FIG. 12.

Piston rod 208 of the piston in cylinder 205 carries a frame work comprising cross members 209 and 210 to which are suitably secured longitudinal frame members 211 and 212 to provide a rigid framework, cross member 210 having an upwardly extending portion, as seen in FIG. 13, to receive piston rod 208. Cross member 209 supports brackets 213 and 214 upon which the micro-switches actuated by the stop plates, as shown at 60, are mounted. A guide rod 215 is suitably mounted in frame member 117 and cooperates with sleeve 216 mounted on cross frame member 209 and a second guide rod 217 is carried by cross frame member 204 and cooperates with sleeve 218 which is carried by cross frame member 219 which is secured to longitudinal frame members 211 and 212. Guide rods 215 and 217 cooperating, respectively, with sleeves 216 and 218 prevent all but longitudinal reciprocating movement of the frame actuated by piston rod 208.

Stop plate 31 is mounted on shaft 220 for movement in sleeve 221 which is carried by cross frame member 209 and shaft 220 engages the actuator 222 of micro-switch 60. Stop plate 31 is prevented from rotation by a suitable guide pin 223. Stop plate 224 for the other extrusion cylinder is mounted on shaft 225 which slides in sleeve 226 carried by cross frame member 219 and cooperates with its respective micro-switch through connecting rod 227. Stop plate 224 is prevented from rotation by guide pin 228 which passes through cross frame member 219.

As seen in FIG. 13, initial adjustment of the spacing between the stop plates and the open ends of their respective dispensing cylinders is obtained by means of a manually actuated handle 229 which drives shaft 230 which passes through frame member 117 and cooperates with cross frame member 209.

The operation of the structure shown in FIGS. 12 and 13 has been generally referred to above. The electric and pneumatic systems are so arranged, as will be described hereinafter, that, when the knife 32 severs the meat after it has engaged the stop plate, a micro-switch will be closed by the descent of the knife closing a circuit to the solenoid actuated valve 207 to admit air under pressure to the piston in cylinder 205 to move the piston and the frame work mounted on piston rod 208 to the left as seen in FIG. 12 thus moving the stop plates away from the adjacent ends of their respective dispensing cylinders. The severed portion of meat is then free to fall into its pie shell. When knife 32 returns to its raised position a micro-switch is closed which energizes an electric circuit to solenoid actuated valve 207 to admit air under pressure to the other side of the piston in cylinder 205 to move piston rod 208 and the frame work mounted thereon and the stop plates associated therewith to the right, as seen in FIG. 12, to their normal positions as determined by the manual adjustment provided by knob 229 and shaft 230.

Figure 14:
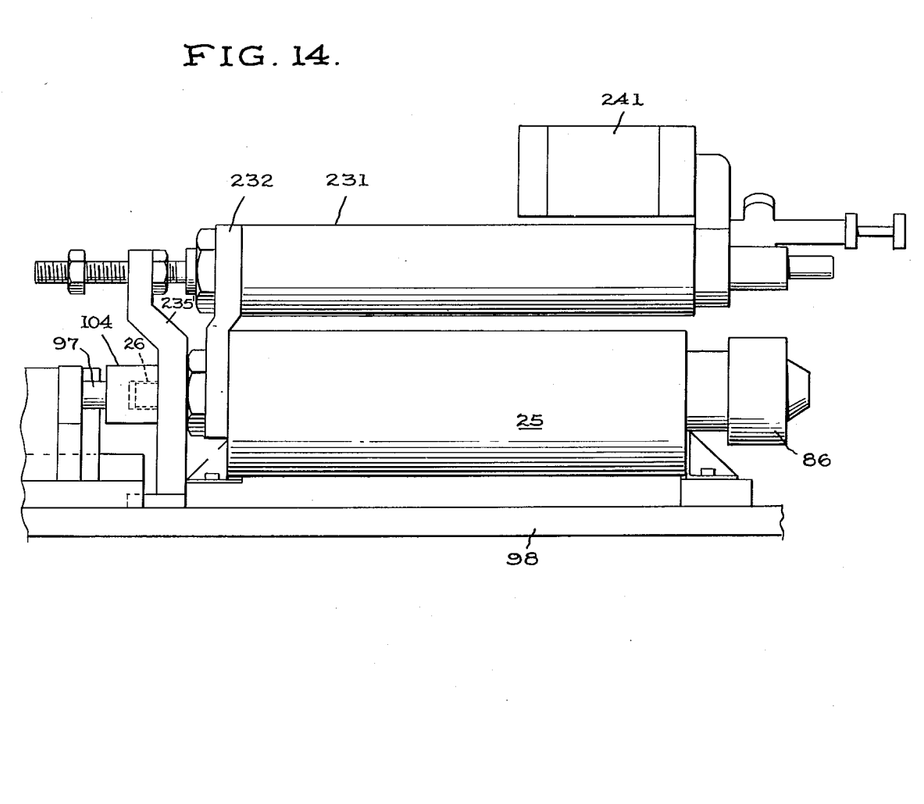
FIG. 14 is an elevation of one of the extrusion cylinders with a hydraulic stop check device connected thereto.
Figure 15:
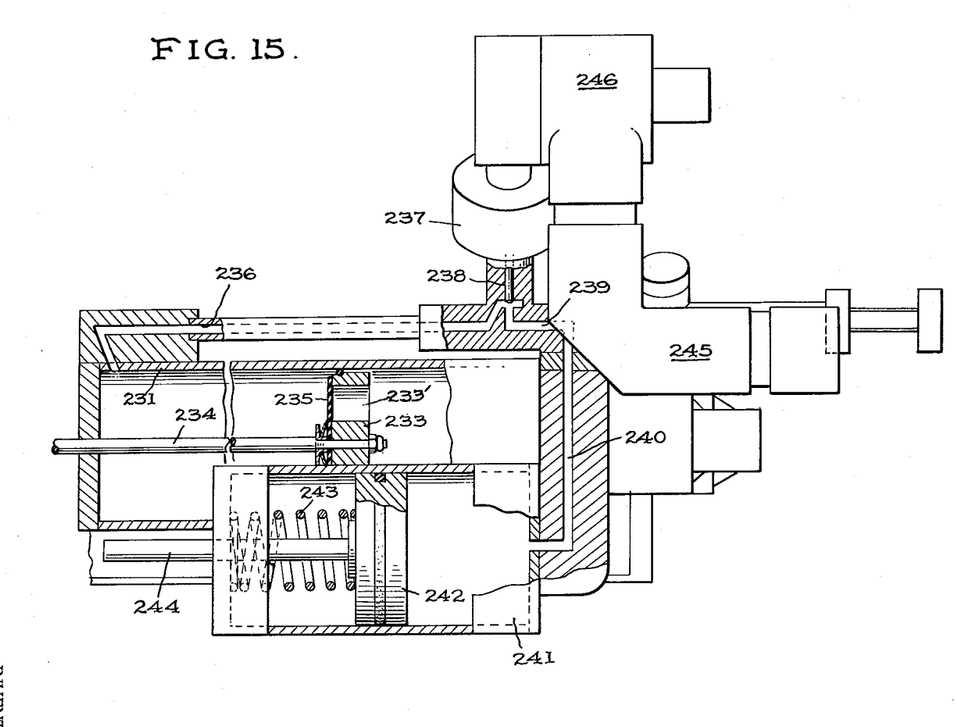
FIG. 15 is a somewhat schematic enlarged view, partly in section, of a suitable hydraulic stop check device as seen in FIG. 14.

It is desirable to provide an immediate stop for the piston in cylinder 25 as soon as the extruded meat contacts stop plate 31 and closes micro-switch 60. To this end a suitable hydraulic stop check device may be connected with cylinder 25 and its piston as shown in FIGS. 14 and 15. As seen in these figures, a suitable cylinder 231 is supported by bracket 232 above cylinder 25. A piston 233 is mounted within cylinder 231 on piston rod 234 and piston rod 234 extends out of cylinder 231 and is connected by link 235' with piston rod 26 of the piston in cylinder 25. Piston 233 is provided with suitable openings 233' therethrough which are closed by suitable flapper devices 235 to prevent flow of hydraulic fluid therethrough on movement of piston 233 to the left as seen in FIG. 15. A suitable conduit 236 leads from the left end of cylinder 231 through a pneumatic pressure actuated valve 237 having a valve element 238. A suitable conduit 239 leads from valve 237 through associated conduit 240 to one end of cylinder 241. Cylinder 241 contains piston 242 which is biased to the right, as seen in FIG. 15, by spring 243 and piston 242 may be provided with a position indicator rod 244.

Cylinder 231, conduits 236, 239 and 240 and the right side of cylinder 241 are filled with a suitable hydraulic fluid.

Air under pressure to actuate valve 237 is admitted thereto through piping 245 which is suitably connected into the pneumatic system of the apparatus, as will appear more fully hereinafter, and the admission of air to valve 237 is controlled by a solenoid actuated valve 246 which solenoid actuated valve is connected into the electrical circuit of the apparatus, as will appear more fully hereinafter, and is energized in timed sequence in the cycle of the apparatus.

The hydraulic check stop device of FIGS. 14 and 15, which may be of known type, operates and functions as follows. When the piston in cylinder 25 moves to the left to extrude meat into engagement with the associated stop plate, piston rod 234 is drawn to the left moving piston 233 to the left and circulating hydraulic fluid out of the left side of cylinder 231 through conduit 236 and past valve element 238, which normally is in open position, the hydraulic fluid then passing through conduits 239 and 240 into cylinder 241 to move piston 242 to the left against spring 243. When the extruded meat engages the associated stop plate micro-switch 60 is closed closing a circuit to solenoid actuated valve 246 which opens admitting air under pressure through conduit 245 to valve 237 thus moving valve member 238 downwardly closing off conduit 236. Flow of hydraulic fluid through conduit 236 is immediately stopped and piston 233 is immediately checked. Since piston rod 234 is connected to piston rod 26 checking of piston 233 immediately stops the piston in cylinder 25 and prevents further extrusion of meat.

As soon as the severed portion of meat drops into its pie shell, stop plate 31 returns to its normal position opening micro-switch 60 and solenoid actuated valve 246 is deenergized returning to its normal position closing conduit 245 and preventing air under pressure from actuating valve 237. Valve member 238 then rises to its normal open position and the apparatus is ready for another extrusion cycle.

Figure 16:
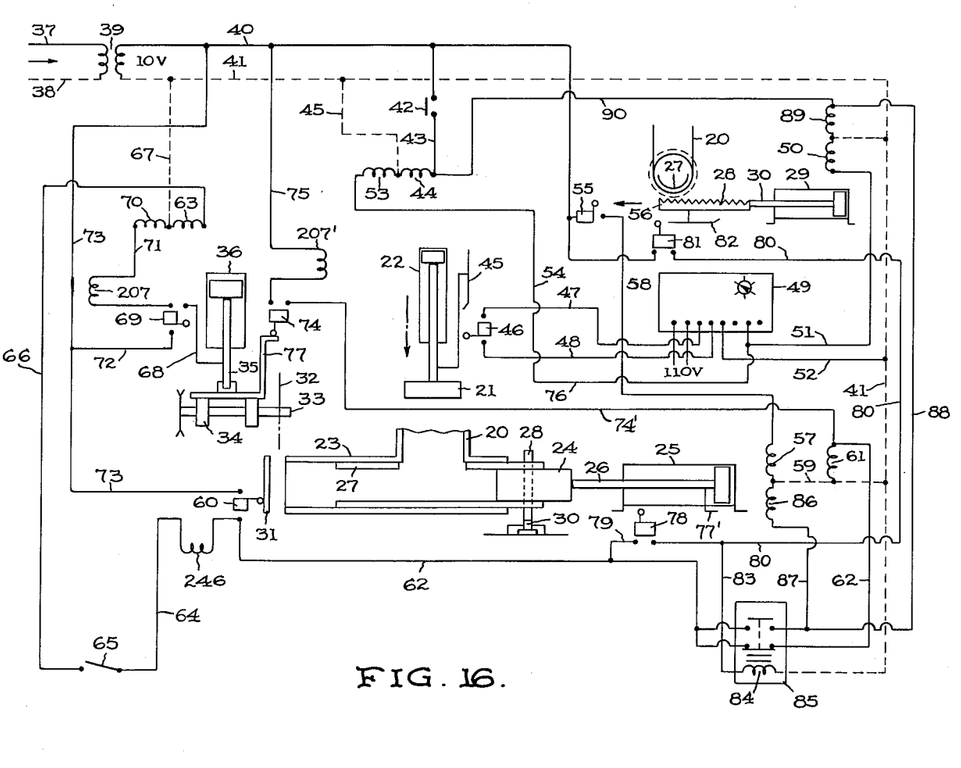
FIG. 16 is a schematic circuit and structural diagram illustrating the operation of a dispensing element incorporating the pneumatic stop plate moving structure of FIGS. 12 and 13 and incorporating the hydraulic stop check device of FIGS. 14 and 15.

Referring now to FIG. 16 it is apparent that the schematic circuit and structural diagram thereof is similar to that of FIG. 10. In FIG. 16 the solenoid of valve 207 for admitting air to cylinder 205 to move the piston therein to the left is connected in series in wire 71 to be energized by the closing of micro-switch 69 when knife 32 is lowered. Solenoid 207' for valve 207, which admits air under pressure to cylinder 205 to move the piston therein to the right as seen in FIG. 12 to return the stop plates to their normal position, is connected in series in wire 75 to be energized by the closing of micro-switch 74 upon return of knife 32 to its raised position.

The solenoid for solenoid actuated switch 246 is connected in series in wire 64 and is energized when micro-switch 60 is closed by movement of stop plate 31 upon extrusion of meat to actuate valve 246 to close passage 236 to arrest the movement of the extrusion piston.

Figure 17:
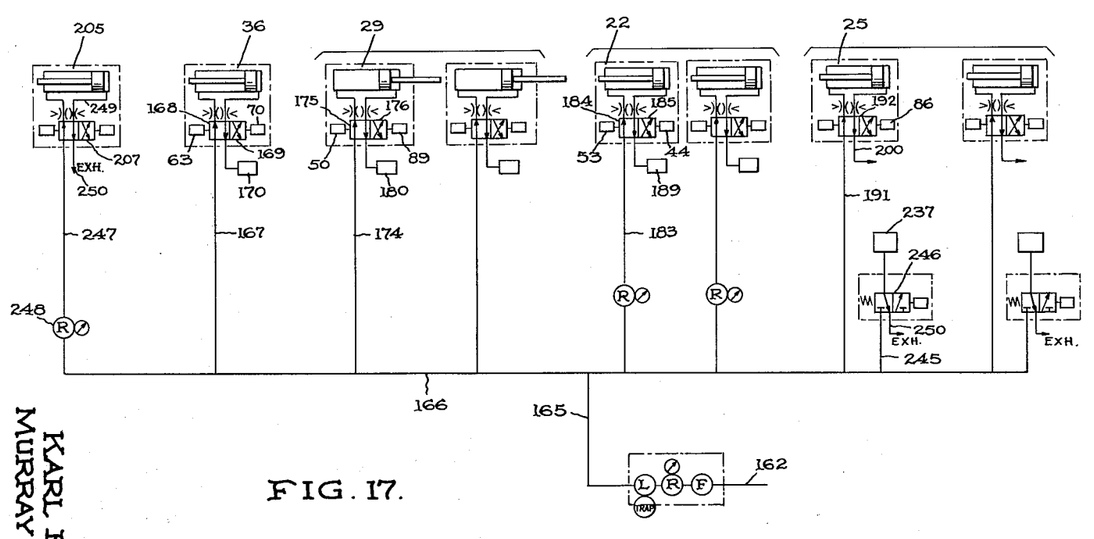
FIG. 17 is a diagrammatic showing of a pneumatic system for a dispensing unit incorporating the additional elements as described with respect to FIG. 16.

The pneumatic system of FIG. 17 will be seen to be similar to that of FIG. 11 modified to include the pneumatic apparatus for cylinder 205 which includes pipe 247 connected through solenoid actuated valve 207 to cylinder 205 and connected to pipe 166 through a suitable pressure regulating valve 248. Cylinder 205 is provided with pipe 249 which connects to the right side thereof and through valve 207. An exhaust pipe 250 leads from valve 207.

In FIG. 17 the pneumatic apparatus for the extrusion cylinder 25 will be seen to be considerably simplified with pipe 191 to solenoid actuated valve 192 leading directly from pipe 166 and with exhaust line 200 from valve 192 leading directly to exhaust.

Pipe 245 leads directly from pipe 166 to solenoid actuated valve 246 and valve 246 connects directly to the stop check valve 237. Pipe 250 leads from valve 246 to exhaust.

It will now be apparent that the electrical circuit described with respect to the schematic showing of FIG. 16 and the pneumatic system as described with respect to FIG. 17 are inter-connected to provide a timed sequence of operations for the structures described in FIGS. 12, 13, 14, and 15 in the cycle of the apparatus.

It should now be apparent to those skilled in the art that by the present invention there is provided a novel automatic machine which in every way satisfies the several objectives described above while overcoming the disadvantages of prior known methods and apparatus for gently forming food portion of constant density from food particles of varying size and compressibility. Indeed, the principle of operation herein-described is applicable with comparable utility to the volumetric filling of particles of food other than meat, to wit, vegetables like cut string beans, chopped leaf spinach and like leaf greens which cannot tolerate excessive compaction.

Changes in or modifications to the above-described illustrative embodiment of this invention may now be suggested to those skilled in the art without departing from the present inventive concept. Reference should, therefore, be had to the appended claims to determine the scope of this invention.

What is claimed is:

1. Apparatus for forming food portions of uniform weight by volumetric measurement including a vertically disposed hopper receiving pieces of food and a horizontally disposed extrusion cylinder receiving food from the hopper through a discharge opening therein, an extrusion piston in said cylinder, a hollow sleeve receiving said piston for closing the discharge opening from said hopper after pieces of food are deposited in said extrusion cylinder, means for moving said piston intermittently in extrusion direction in said cylinder to collect said food pieces together axially thereof and cause them to move as a unit mass therein of greater volume than the food portion to be formed, a stop plate opposite and spaced from the extrusion end of said cylinder, means connected to said means for moving said piston actuated by movement of said stop plate operative to terminate extrusion movement of said piston moving means and cut-off means controlled by said stop plate for severing the extruded food mass when extrusion movement is intermittently terminated whereby a plurality of food portions are formed from the unit mass thereof in said cylinder.

2. Apparatus for forming food portions of uniform weight by volumetric measurement including a vertically disposed hopper receiving pieces of food and a horizontally disposed extrusion cylinder receiving food from the hopper through a discharge opening therein, an extrusion piston in said cylinder, a hollow sleeve rotatable in said cylinder and receiving said piston for closing the discharge opening from said hopper, means for rotating said hopper closing means after pieces of food are deposited in said extrusion cylinder, means for moving said piston intermittently in extrusion direction in said cylinder to collect said food pieces together axially thereof upon closing the discharge opening from said hopper and cause them to move as a unit mass therein of greater volume than the food portion to be formed, a stop plate opposite and spaced from the extrusion end of said cylinder, means connected to said means for moving said piston actuated by movement of said stop plate operative to terminate extrusion movement of said piston moving means and cut-off means controlled by said stop plate for severing the extruded food mass when extrusion movement is intermittently terminated whereby a plurality of food portions are formed from the unit mass thereof in said cylinder.

3. Apparatus for forming food portions of uniform weight by volumetric measurement including a vertically disposed hopper receiving pieces of food and a horizontally disposed extrusion cylinder receiving food from the hopper, a piston in said cylinder, pneumatic means for moving said piston intermittently in extrusion direction in said cylinder to extrude said food pieces by collecting them axially of said cylinder and causing them to move as a unit mass of greater volume than the food portion to be formed in said cylinder, electrically actuated valve means controlling air under pressure admitted to said pneumatic means for affecting said intermittent extrusion movement, a stop plate opposite and spaced from the extrusion end of said cylinder, an electric switch actuated by movement of said stop plate, circuit means between said switch and said electrically actuated valve means closing said valve means when said switch is actuated and terminating extrusion movement of said piston, and cut-off means controlled by said stop plate for severing the extruded food mass when extrusion movement is intermittently terminated whereby a plurality of food portions are formed from the unit mass thereof in said cylinder, said cut-off means including a knife, pneumatic means for moving said knife across the extrusion end of said cylinder, second electrically actuated valve means controlling air under pressure admitted to said pneumatic means for moving said knife, and second circuit means between said electric switch and said second electrically actuated valve means actuating said second valve means when said switch is closed and moving said knife across the extrusion end of said cylinder, second pneumatic means actuated by the movement of said knife across the extrusion end of said cylinder for moving said stop plate and said electric switch away from the extrusion end of said cylinder.

4. Apparatus for forming food portions of uniform weight by volumetric measurement including a vertically disposed hopper receiving pieces of food and a horizontally disposed extrusion cylinder receiving food from the hopper, a piston in said hopper, pneumatic means for moving said piston in said hopper, electrically actuated valve means controlling air under pressure admitted to said pneumatic means, circuit means including a manually actuated switch for actuating said valve means, a second piston in said cylinder, second pneumatic means for moving said piston intermittently in extrusion direction in said cylinder to extrude said food pieces by collecting them axially of said cylinder and causing them to move as a unit mass of greater volume than the food portion to be formed in said cylinder, second electrically actuated valve means controlling air under pressure admitted to said second pneumatic means for effecting said intermittent extrusion movement, a second electric switch closed by movement of said first piston, second circuit means connecting said second switch and said second electrically actuated valve means actuating said valve means when said switch is closed and admitting air under pressure to said second pneumatic means and moving said second piston in extrusion movement, a stop plate opposite and spaced from the extrusion end of said cylinder, a third electric switch actuated by movement of said stop plate, third circuit means between said third switch and said second electrically actuated valve means actuating said valve means when said third switch is closed terminating admission of air under pressure to said second piston, stop-check means for said second piston, electrically actuated means actuated by movement of said stop plate energizing said stop-check means and stopping said second piston and cut-off means controlled by said stop plate for severing the extruded food mass when extrusion movement is intermittently terminated whereby a plurality of food portions are formed from the unit mass thereof in said cylinder.

5. A machine as described in claim 4 said cut-off means including a knife, third pneumatic means for moving said knife across the extrusion end of said cylinder, third electrically actuated valve means controlling air under pressure admitted to said third pneumatic means, and fourth circuit means between said third electric switch and said third valve means actuating said third valve means when said third switch is closed and moving said knife across the extrusion end of said cylinder.

6. A machine as described in claim 5 including pneumatic means actuated by the movement of said knife across the extrusion end of said cylinder for moving said stop plate and said third switch away from the extrusion end of said cylinder.

7. In an automatic meat pie filling machine including a conveyor for moving trays of pie shells to be filled beneath dispensing elements each tray holding four pie shells arranged at the corners of a rectangle, a pair of parallel dispensing elements dispensing into diagonally situated pie shells on the tray and a second pair of parallel dispensing elements dispensing into the pie shells situated on the other diagonal of the tray, each of said dispensing elements including a horizontal meat extrusion cylinder, a piston in said cylinder, means for moving said piston intermittently in extrusion movement to extrude said meat pieces by collecting them axially of said cylinder and causing them to move as a unit mass of greater volume than the meat portions to be formed in said cylinder, a stop plate spaced from and opposite the extrusion end of said cylinder, means connected to said piston moving means actuated by movement of said stop plate for terminating extrusion movement of said piston, a knife, means for moving said knife across the extrusion end of said cylinder when said extrusion movement is intermittently terminated, and control means actuated by the presence of a tray beneath the dispensing element energizing said knife moving means when said stop plate is moved whereby a plurality of meat portions are formed from the unit mass thereof in said cylinder.

8. In an automatic meat pie filling machine including a vertically disposed hopper receiving pieces of meat and a horizontally disposed extrusion cylinder receiving meat from the hopper, a piston in said hopper, means for moving said piston intermittently in extrusion direction in said hopper, electrically actuated means controlling said moving means, circuit means including a manually actuated switch for actuating said control means, a rotary member in said cylinder rotatable to position closing off said hopper from said cylinder, second means for rotating said member, second electrically actuated means controlling said second rotating means, second circuit means including a second electric switch closed by downward movement of said piston actuating said second control means and rotating said member to hopper closing position, a second piston in said cylinder, third means for moving said second piston in intermittent extrusion movement to extrude said pieces by causing them to move as a unit mass of greater volume than the meat portions to be formed in said cylinder, third electrically actuated control means for said third moving means, third circuit means including a third electric switch closed by rotation of said member actuating said third control means and moving said second piston in extrusion movement, a stop plate opposite and spaced from the extrusion end of said cylinder, a fourth electric switch actuated by movement of said stop plate, fourth circuit means between said fourth switch and said third electrically actuated control means actuating said third control means when said fourth switch is closed and terminating extrusion movement of said piston and cut-off means controlled by said stop plate for severing the extruded food mass when extrusion movement is intermittently terminated whereby a plurality of food portions are formed from the unit mass thereof in said cylinder.

9. Apparatus for forming food portions of uniform weight by volumetric measurement including a hopper receiving pieces of food and an extrusion cylinder disposed normally with respect to said hopper for receiving said food pieces therefrom, an extrusion piston in said cylinder having an intermittent movement in the extrusion direction for collecting said pieces together axially thereof as a unit mass and extruding said mass step-by-step therefrom, means for moving said piston in the extrusion direction, means for cutting off an extruded portion of said mass at the exit end of said cylinder, a stop member opposite and spaced from the extrusion end of said cylinder, and control means for said piston-moving means and for said cut-off means and operable by displacement of said stop member from normal position upon engagement of said extruded mass therewith to stop extrusion movement of said piston and to actuate said cut-off means, the return of said stop member thereafter to normal position causing said control means to re-start said piston moving means.

References Cited in the file of this patent
UNITED STATES PATENTS

| | | |
|---|---|---|
| 233,449 | West et al. | Oct. 19, 1880 |
| 1,292,645 | Reisfeld | Jan. 28, 1919 |
| 1,881,171 | Cooley | Oct. 4, 1932 |
| 2,144,335 | Jensen et al. | Jan. 17, 1939 |
| 2,334,774 | Jordan | Nov. 23, 1943 |
| 2,541,907 | Appling | Feb. 13, 1951 |
| 2,716,510 | Massmann | Aug. 30, 1955 |
| 2,722,276 | Revelle | Nov. 1, 1955 |
| 2,750,089 | Colantino | June 12, 1956 |
| 2,787,832 | Conway | Apr. 9, 1957 |
| 2,880,765 | Pugsley et al. | Apr. 7, 1959 |
| 2,911,776 | Sada | Nov. 10, 1959 |